Oct. 17, 1967  P. N. SMITH ETAL  3,348,222
SCANNING TYPE MONITORING AND CONTROL APPARATUS
Original Filed March 25, 1963  3 Sheets-Sheet 2
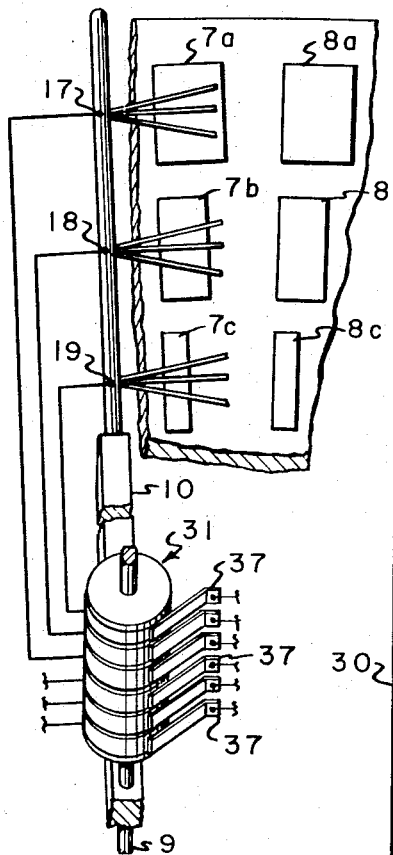
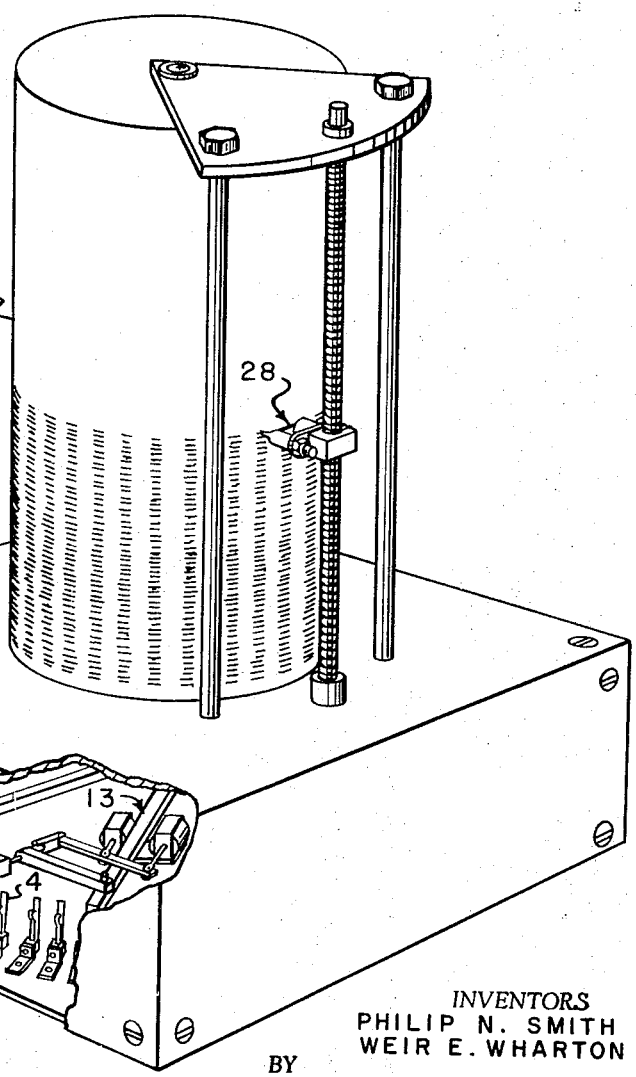
FIG.-2-
FIG.-4-
INVENTORS
PHILIP N. SMITH
WEIR E. WHARTON
BY
ATTORNEY

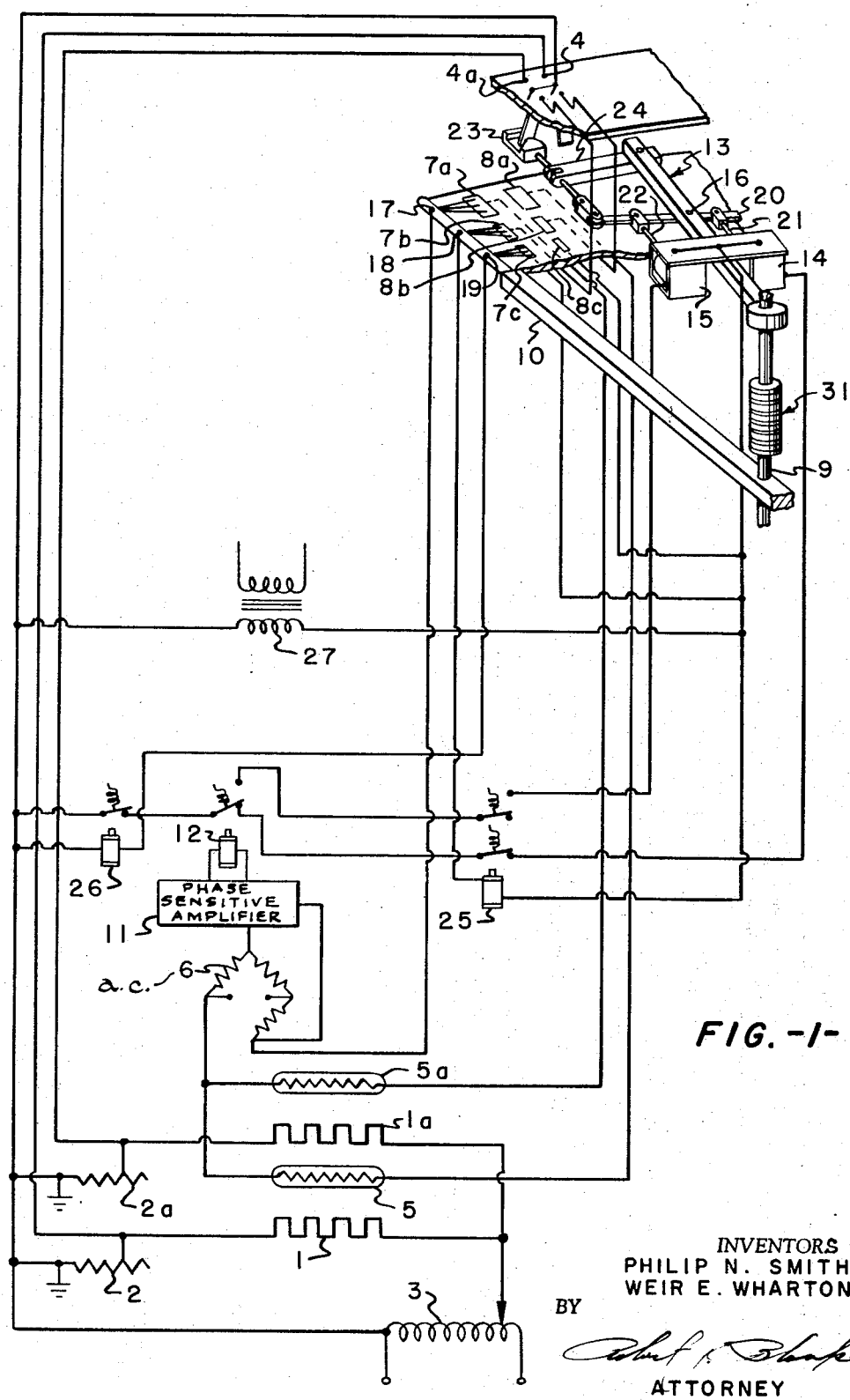

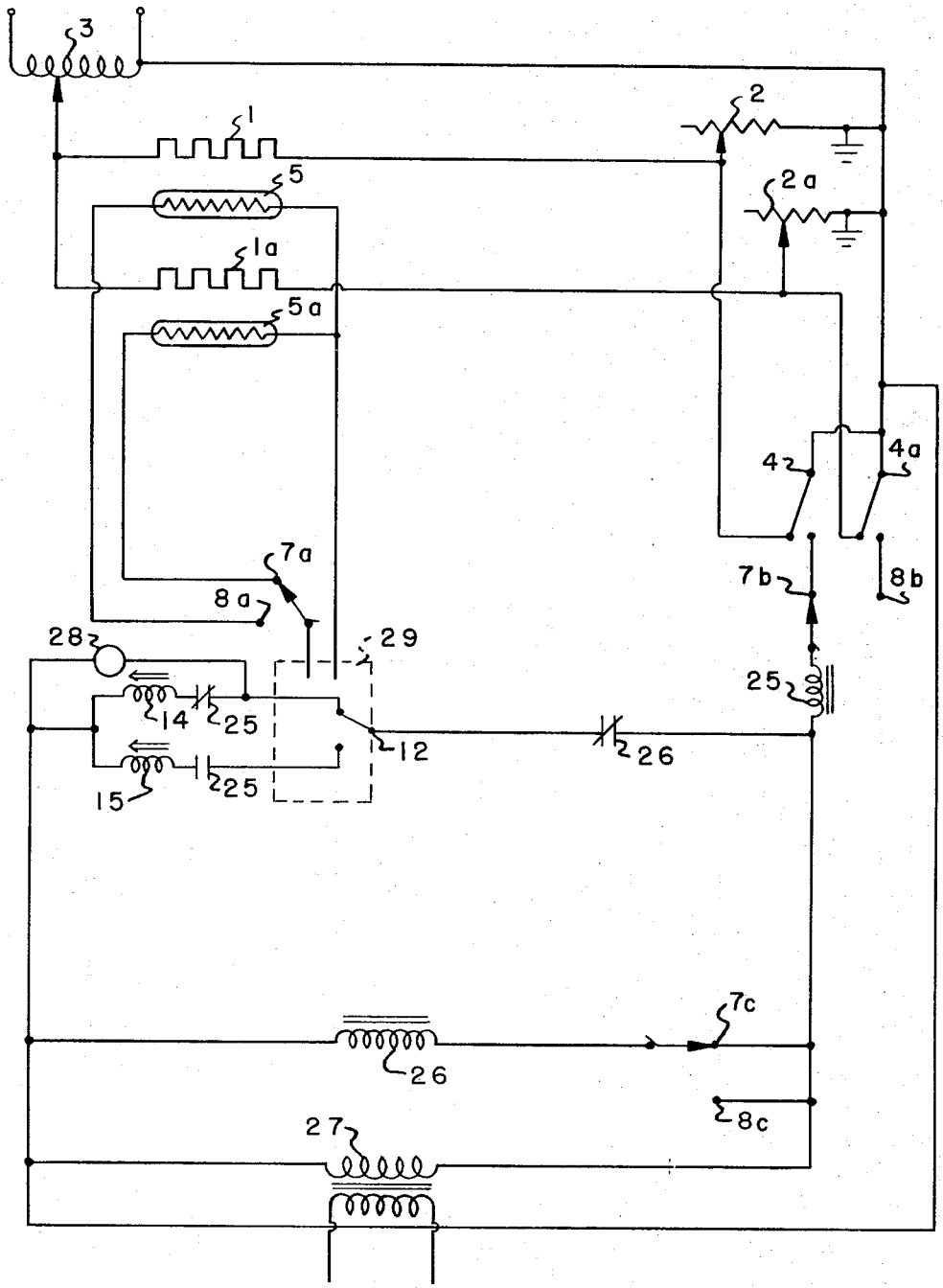
FIG.-3-

3,348,222
SCANNING TYPE MONITORING AND CONTROL APPARATUS

Philip N. Smith and Weir E. Wharton, Spartanburg, S.C., assignors to Deering Milliken Research Corporation, Spartanburg, S.C., a corporation of Delaware
Continuation of application Ser. No. 267,742, Mar. 25, 1963. This application Sept. 1, 1966, Ser. No. 576,772
6 Claims. (Cl. 340—413)

This application is a continuation of U.S. patent application Ser. No. 267,742, filed Mar. 25, 1963, now abandoned.

This invention relates to monitoring and control apparatus and more specifically to a scanning type monitoring and control apparatus which monitors and actuates a series of control points in response to an electrical pulse.

While monitoring and control apparatus for individual units of the on-off controllable type are well known, the expense of such monitoring and control apparatus when employed in operations requiring a plurality of units raises the cost of the monitoring and control apparatus to prohibitive levels. Plural units requiring monitoring and control are units such as for instance heating units requiring a predetermined temperature, liquid storage tanks requiring a predetermined liquid level and gas storage tanks requiring a predetermined pressure. It can easily be seen that a single device which can monitor and control a plurality of units would be a significant advance in the art.

It is therefore an object of this invention to devise a monitoring and control apparatus which will monitor and control a plurality of units.

It is another object of this invention to devise an apparatus which will measure, control and record the operation of a plurality of units.

These and other objects of the invention will become apparent from the following discussion.

The monitoring and control apparatus of this invention comprises in its most elementary form one or more memory devices having two intelligence transmitting outputs which are selectively placed in one of two bistable conditions by an actuator which is controlled by any one of a plurality of detecting devices which are disposed at spaced stations separate from the corresponding memory devices. Memory devices having two intelligence transmitting outputs which are suitable for purposes of this invention are neon tubes, four layer diodes and bistable switches. The preferred memory device is a bistable switch. Dealing specifically with the bistable switch for instance, the switch has two intelligence transmitting outputs corresponding to its two bistable conditions. Preferably the intelligence is continuous from or to the bistable switch except during switching action, and consequently one of two intelligence signals will be transmitted from the bistable switch at all times except during switching, which is only momentary. This output intelligence from the bistable switch may be employed in a number of ways, such as for instance recording information corresponding to the intelligence signal as by employment of a recorder showing for instance on or off, or absence or presence, of a detected condition. Alternatively, and in the case of the employment of the device for control purposes, the intelligence signal from each bistable switch element may be employed in a quasi-feedback relation to determine the final result of the signal being generated by the detector for the zone controlled by the instant bistable switch. In this latter case, the two intelligence signals from the output of the bistable switch are employed to determine whether a switch actuating device will be energized. The actuating device may be a device of the type employing two solenoid coils, each of which coils have associated therewith a movable armature and a fixed yoke member, the movable armature being adapted to move into magnetic solenoid closing relation upon energization of the corresponding solenoid coil, and being normally biased in a direction extending away from the fixed armature as by a spring. The two movable armatures move in opposition to one another and are spaced apart so as to form in combination with the yoke member, a U-shaped device having two movable legs. The armature legs serve to move the bistable switch from one of its conditions to the other, or to permit the bistable switch to be maintained in the same condition dependent upon the detected condition at the instant detection station. Preferably this is accomplished by employing a comparing means such as a bridge to compare the condition at the detection station with an arbitrary standard condition, and providing an output signal which is proportional to the difference between the arbitrary standard and the compared condition.

This proportional output may then be employed to control a relay having one of two conditions, as for instance, energized and de-energized. If the proportional input signal thereto is above a given value then the relay will be energized and a first set of contacts will be closed, whereas if the proportional signal is below this given value (which is the pull-in value of the relay), then a second set of contacts will be energized, corresponding to the de-energization state of the relay. By providing the first set of contacts in series with one of the solenoids of the switch actuator and the second set in series with the other solenoid of the switch actuator, it is possible to actuate the switch as a direct function of the detected condition at the instant station corresponding to this particular bistable switch. It should be understood, however, that switch actuation does not take place when the intelligence signal from the bistable switch indicates that the switch is already in that position called for by the output signal from the comparing means.

A better understanding of the invention may be had from the drawings which are as follows:

FIGURE 1 is a schematic diagram showing a scanning type regulator system suitable for measuring and controlling a plurality of units.

FIGURE 2 is a broken projected view of one portion of the measuring and control apparatus of this invention.

FIGURE 3 is a circuit diagram showing one embodiment of a regulator system suitable for measuring and controlling a plurality of units.

FIGURE 4 is a broken projected view of one type of recording device coupled to the measuring and control apparatus of this invention.

Referring to FIGURE 1 of the drawing, 1 and 1A indicate heaters or other devices to be maintained within a preselected temperature range. Heaters 1 and 1A are wired in series with variable resistors 2 and 2A, respectively. A source of power coming from a high voltage power supply 3 is caused to pass through variable resistors 2 and 2A when switch members 4 and 4A, respectively, are open. When switch members 4 and 4A are closed, however, current from high voltage power supply 3 will pass directly to heating members 1 and 1A, the direct passage of current from power supply 3 resulting, of course, in higher temperatures in heaters 1 and 1A than would be possible had the power supply passed through variable resistors 2 and 2A prior to entering heaters 1 and 1A, respectively. It should be understood that for ease of illustration only two heating elements 1 and 1A and two switching elements 4 and 4A with a corresponding circuitry have been shown but that the apparatus of this invention is suitable for measuring and controlling any number of units such as, for instance, several hundred units. It should also be understood that for ease of illustration the switch members and the mechanical portions of the scanning system have been shown in inverted position. The only upper limit which is imposed on the number of units which may be controlled is the limiting factor which would be placed on the size of the control apparatus. Switching means 4 and 4A are bistable switches, the positioning of the bistable switches being controlled by means of an electronic pulse which measures the condition of the unit being controlled. In the case of FIGURE 1, the heating units 1 and 1A have their temperatures measured by thermistors 5 and 5A, respectively. One terminal of each of thermistors 5 and 5A respectively is connected to bridge member 6. The opposite terminal of thermistors 5 and 5A respectively are connected to large contacts 7A and 8A respectively of a scanning unit. The scanning unit employs three separate contacts for each heating or other unit being controlled. For ease of illustration, only two of the contact assemblies have been shown. Arm member 10 secured to a pivot member 9 carrying wiper brushes 17, 18 and 19 completes circuits when passing over the fixed sets of contacts. The arrangement of the wiper brushes and contacts may be seen in an expanded view in FIGURE 2. Wiper brush 17, when engaging contact 7A, places thermistor 5A in contact with bridge 6. Correspondingly wiper brush 17, when engaging large contact 8A places thermistor 5 in contact with bridge 6. As arm member 10 carrying brush members 17, 18 and 19 swings around a 360° circle, it can readily be seen that a substantial number of units may be measured and controlled by means of this scanning system. The bridge member 6 which has a separate source of alternating current is connected to phase sensitive amplifier 11 which is connected in turn to output relay 12. Output relay 12 is actuated by an electronic pulse of preselected intensity. In the case of FIGURE 1, the phase sensitive amplifier determines whether the temperature of the heater member is above or below a set point. By analyzing that amount of current which will flow through a thermistor member and across bridge member 6 into phase sensitive amplifier 11, the output relay 12 then makes the contact called for by phase sensitive amplifier 11. Output relay 12 completes the circuit to one of two solenoids carried in switch actuating member 13. Switch actuating member 13 comprises a bar member 16 carrying a high solenoid 14 and a low solenoid 15 disposed on opposite sides of bar member 16, a pivoted member 20 which is carried by arm member 16 and which is actuated by either high solenoid armature member 21 or low solenoid armature member 22. Pivot member 20 then actuates switch actuating member 23, the registry of switch actuating member 23 being aided by guide member 24. Switch actuating member 23 is secured to arm member 16 carried by pivot member 9 so as to be synchronized to actuate, if so required, a bistable switch simultaneous with the scanning by brush members 17, 18 and 19 for varying time intervals of contacts corresponding to the actuated switch. Pivot member 9 carries slip ring assembly 31 which contains six individual contact rings in order to obtain a stationary contact from the revolving wire leads from the brush members and the solenoid members. In order to simplify the wiring diagram, the wire leads have not been shown to make contact with the slip ring assembly 31, however, an actual showing of a contact between wire leads and slip ring assembly 31 is set forth in FIGURE 2.

As previously mentioned, output relay 12 makes the contact called for by phase sensitive amplifier 11. The positions of bistable switches 4 and 4A are determined by contacting brush member 18 with medium sized contacts 8B and 7B, respectively. If the bistable switches are in the closed circuit position, control relay 25 will not be energized. If the bistable switches are in the open circuit position, control relay 25 will be energized. The circuit which control relay 25 will open on energization is the circuit to low solenoid 15. The circuit which control relay 25 will close on energization is the circuit to high solenoid 14, the energization of the proper solenoid having previously been selected by output relay 12. When brush member 19 engages one of small contact members 7C and 8C, control relay 26 is energized thereby placing low voltage power supply 27 in circuit with the solenoid member selected. The solenoid member 14 or 15 as the case may be will then energize switch actuating member 23 and thereby change the position of bistable switch 4 or 4A if so required.

As previously metnioned with regard to FIGURE 1, each heating or other unit being monitored and/or controlled requires three separate contacts which are periodically scanned. The surface area of the contacts vary, the size of each being determined by that circuit duration which is desirable for the specific circuit completed. Contact members 7A and 8A which complete the circuit to thermistors 5 and 5A, respectively, are the largest surface area contacts and are also disposed on the outer edge of the scanning circle. Contact members 7B and 8B which complete the circuit to bistable switch are of medium surface area, being smaller than contact members 7A and 8A and being disposed nearer the center of the scanning circle than contact members 7A and 8A. Contact members 7C and 8C which complete the 24 volt energizing circuit have the smallest surface area of all the contacts and are disposed nearest the center of the scanning circle.

A better understanding of the relative proportions of the contact members may be had from a view of FIGURE 2. FIGURE 2 clearly illustrates the large dimensions of contacts 7A and 8A, the medium dimensions of contacts 7B and 8B and the small dimensions of contacts 7C and 8C. As arm member 10, which is broken for ease of illustration, carrying brush members 17, 18 and 19 swings around a 360° circle, brush member 17 will contact large contact 7A prior to brush member 18 contacting medium contact 7B and similarly medium contact 7B will be in circuit with brush member 18 prior to an engagement between small contact 7C and brush member 19. Brush member 17 will also remain in contact with large contact 7A during the duration of contact between brush member 18 and medium contact 7B and brush member 19 and medium contact 7C. Similarly brush member 18 will remain in contact with medium contact 7B during the duration of contact between brush member 19 and small contact 7C. The means by which current is transferred from rotating arm member 10 is also shown in FIGURE 2. Slip ring assembly 31 is joined together with arm member 10 to pivot member 9. Slip ring assembly 31 carries six bands or contact rings three of which are illustrated as being joined to wire leads issuing from brush members 17, 18 and 19. The three remaining contact rings of slip ring assembly 31 are used to contact the wire leads issuing from the solenoids which are not illustrated in FIGURE 2. Six stationary brush members 37 make contact with the six bands or contact rings of slip ring assembly 31 to provide stationary contacts.

The desirability of having the larger contacts extend beyond the smaller contacts circumferentially in the direction of movement of the brush element is to allow the larger contact to maintain its contact for a greater period of time and thereby prevent any possibility of disengagement of the brush element from the larger contact before contact is made with the smaller contact. A further reason for this safety feature is that the analysis circuit will see an infinite resistance when the brush is between contacts. In such an instance, the input intelligence signal from the detected station will be apparently infinite resistance, and correspondingly the yoke and solenoid arrangement will be moved to correct for this infinite resistance, and if this is not the proper condition for the particular bistable switch then the bistable switch will be left in the wrong position. It is therefore desirable that the solenoids not be energized during the entire detection and analysis portion of the cycle but only during the middle of this cycle. This also serves to permit the yoke and solenoid arrangement to return to neutral position after proper actuation of the instant bistable switch element and prior to arriving at the next bistable switch element which is to be controlled thereby. It is also desirable that those contacts employed for completion of circuits which detect conditions be substantially larger and therefore of greater contact time duration than the smallest contact which merely energizes the solenoid circuit, in order to permit fullest possible utilization of the intelligence signals received.

Additional features and more specifically the recording features of the apparatus of this invention may be readily seen from a description of FIGURE 3 which is a circuit diagram. As in FIGURE 1, FIGURE 3 merely sets forth the monitoring and control of two units for ease of illustration. It should be understood, however, that the apparatus of this invention is suitable for the control of a plurality of units, the units being members such as for instance heating units, liquid control valves, gas control valves and, in fact, any unit which may be regulated by a two-position memory switch. In FIGURE 3, heating elements 1 and 1A are placed in circuit with variable resistance members 2 and 2A, respectively, heating elements 1 and 1A being energized by a source of alternating current 3. Bistable switches 4 and 4A determine the flow of current reaching heating elements 1 and 1A, respectively. When bistable switches 4 and 4A are in a closed position, high voltage alternating current will flow directly to heating elements 1 and 1A respectively. When, however, bistable switches 4 and 4A are in an open position, current must flow through variable resistance units 2 and 2A thus furnishing reduced amounts of current and consequently lower heat to heating elements 1 and 1A, respectively. Thermistor units 5 and 5A are positioned adjacent heating units 1 and 1A, respectively. One terminal of each of thermistors 5 and 5A is connected to controller unit 29. The other terminal of controller 29 is connected to large contact 7A while the other terminals of thermistors 5 and 5A are connected to large contacts 8A and 7A respectively. When a scanning arm member closes the contact between controller 29 and large contact 7A or large contact 8A, a measurement is taken of thermistor 5 or 5A by controller 29. Controller 29 then makes the contact called for at relay 12, the position being determined by whether the temperature of heating units 1 or 1A are above or below a predetermined temperature. Subsequent to completion of the circuit between one of large contacts 7A or 8A and controller unit 29, a scanning arm completes the circuit between medium contact 7B or medium contact 8B and control relay 25. When the circuit is completed as for instance between medium contact 7B and control relay 25 the position of bistable switch 4 is determined. When the scanning arm completes the circuit between control relay 25 and for instance medium contact 8B, the position of bistable switch 4A is determined. Control relay 25 controls a portion of the circuits between high solenoid 14 and low solenoid 15, the control being determined by the positioning of the switch members 4 and 4a which cause relay 25 to be energized or de-energized. If the bistable switches are not in the proper position called for by controller 29, controller 29 will through relay member 12 complete the circuit to the proper solenoid member thereby permitting the energizing of a mechanical member which will throw switch 4 or switch 4A into another position. Energizing low solenoid 15 and high solenoid 14 require closing the circuit between solenoids 14 and 15 and a source of 24 volt alternating current 27. The low voltage alternating power supply 27 is put into the circuit by means of a scanning arm closing the circuit between small contact 7C or small contact 8C and control relay 26. Control relay 26 then completes the circuit delivering low voltage alternating current to the preselted solenoid. If desired, a printing member 28 may be wired into the relay circuit 12 that actuates high solenoid 14. High solenoid 14 actuates the mechanical member which throws the bistable switch into that position whereby heating unit 1 or 1A will be directly connected to the high voltage alternating current supply 3. Printing unit 28 is thereby actuated each time relay member 12 is in a preselected position. Printing unit 28 may be seen in FIGURE 4 and will be described more fully hereafter. Any unit being controlled which records more than the average number of print marks will therefore be easily noted and may be quickly checked for failure in the circuitry.

The manner in which the printing device functions is more readily apparent from a discussion of FIGURE 4 of the drawings. FIGURE 4 is a projected view of the measuring and control device of this invention wherein a printing device is employed so as to record the position of each bistable switch. In FIGURE 4, a drum member 30 rotates at the same speed as bistable switch actuating member 13. For ease of illustration, only a few bistable switch members 4 have been shown. It should be understood, however, that bistable switch members 4 may be positioned around the entire periphery of the circle monitored by switch actuating member 13. As previously explained, each time relay member 12 is in a preselected position, printing member 28 is also put into circuit and will mark the event as drum member 30 contains a marking area for each of the bistable switch members which are in turn coupled to the devices which they control and measure. Each mark made by printing member 28 on drum member 30 may be used to interpret the manner in which a specific unit being controlled is functioning. After drum member 30 completes one 360° revolution, printing member 28 is elevated to a higher position by means of suitable mechanical traversing devices. After several complete revolutions, it will be readily apparent to any skilled operator that those units which are placing a greater or lesser than average number of marks on rotating drum 30 may be malfunctioning units and these units which are thereby easily singled out may be repaired.

What is claimed is:

1. An apparatus for monitoring units of the on-off adjustable type comprising a plurality of bistable switch means in circuit with said units, said plurality of bistable switch means being arranged in a circular path and each having a set of fixed contacts, detection means operably associated with each of said units, actuation means operably associated with said bistable switch means to actuate said bistable switch means, said actuation means having a plurality of contact members, means rotating said contact members around said circular path to contact said sets of fixed contacts to sequentially actuate said detection means and said actuation means, said detection means including means to preset said actuation means to a predetermined position and means to determine the position of said bistable switch means and to actuate said actuation means when said bistable switch means is in a predetermined position.

2. The apparatus of claim 1 wherein said fixed contacts in each of said sets are radially spaced from one another and are of a different size to allow at least one of said fixed contacts to be contacted by one of said contact members before another one of the fixed contacts is contacted by another contact member.

3. The apparatus of claim 2 wherein there are three fixed contacts in each set and there are at least three contact members.

4. The apparatus of claim 1 wherein said actuation means includes a lever member pivotally mounted thereto, a solenoid actuated rod member attached to said lever on both sides of said pivot point and each of said solenoid actuated rod members having a solenoid operably associated therewith, one of said solenoids being actuated to pivot said lever member to reposition said bistable switch means.

5. The apparatus of claim 4 wherein said fixed contacts in each of said sets are radially spaced from one another and are of a different size to allow at least one of said fixed contacts to be contacted by one of said contact members before another one of the fixed contacts is contacted by another contact member.

6. The apparatus of claim 5 wherein there are three fixed contacts in each set and there are at least three contact members.

References Cited

UNITED STATES PATENTS

| | | | |
|---|---|---|---|
| 1,676,448 | 7/1928 | Krum et al. | 178—53.1 |
| 1,860,191 | 5/1932 | Linstow et al. | 178—53 |
| 2,035,358 | 3/1936 | Yates | 340—183 |
| 2,285,819 | 6/1942 | Leathers | 340—183 |
| 2,407,361 | 9/1946 | Wilson | 340—183 |
| 2,504,931 | 4/1950 | Knudsen | 340—183 |
| 2,564,294 | 8/1951 | Belecher | 340—183 |
| 3,103,001 | 9/1963 | Hage | 340—183 |
| 3,196,254 | 7/1965 | Knoop | 219—486 |

NEIL C. READ, *Primary Examiner.*

THOMAS A. ROBINSON, *Examiner.*